(12) United States Patent
Muthiah

(10) Patent No.: US 12,250,417 B2
(45) Date of Patent: Mar. 11, 2025

(54) DATA STORAGE DEVICE AND METHOD FOR SELECTING A DATA RECOVERY MECHANISM BASED ON A VIDEO FRAME POSITION

(71) Applicant: Western Digital Technologies, Inc., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/224,840

(22) Filed: Jul. 21, 2023

(65) Prior Publication Data
US 2024/0298044 A1    Sep. 5, 2024

Related U.S. Application Data

(60) Provisional application No. 63/449,783, filed on Mar. 3, 2023.

(51) Int. Cl.
*H04N 21/231* (2011.01)
*H04N 21/232* (2011.01)

(52) U.S. Cl.
CPC ......... *H04N 21/231* (2013.01); *H04N 21/232* (2013.01)

(58) Field of Classification Search
CPC ............ H04N 21/4305; H04N 21/2404; H04L 65/80; G06F 11/0757
See application file for complete search history.

(56) References Cited

U.S. PATENT DOCUMENTS

| | | | |
|---|---|---|---|
| 7,760,230 B2 | 7/2010 | Russell et al. | |
| 7,852,853 B1* | 12/2010 | Black | H04N 21/238 714/751 |
| 8,265,154 B2 | 9/2012 | Gardner | |
| 8,855,466 B2 | 10/2014 | Thornberry | |
| 9,455,010 B1 | 9/2016 | Chen et al. | |
| 10,841,645 B1* | 11/2020 | Muthiah | H04N 21/4335 |
| 2019/0238158 A1* | 8/2019 | Bhatia | G11C 29/52 |

OTHER PUBLICATIONS

Chang, Ching-Lung et al, "XOR-based frame loss recovery scheme for video streaming", Jul. 1, 2011, ScienceDirect, Computer Communications vol. 34 Issue 10, pp. 1195-1201 (Year: 2011).*

* cited by examiner

*Primary Examiner* — Nicholas T Corbo
(74) *Attorney, Agent, or Firm* — Crowell & Moring LLP

(57) ABSTRACT

A data storage device and method are provided for selecting a data recovery mechanism based on a video frame position. In one embodiment, a data storage device is provided comprising a memory and a controller. The controller is configured to retrieve a video frame stored in the memory; detect an error in the video frame; and select how to handle the error based on a position of the video frame in a group of pictures. Other embodiments are provided.

18 Claims, 8 Drawing Sheets

DATA STORAGE DEVICE AND METHOD FOR SELECTING A DATA RECOVERY MECHANISM BASED ON A VIDEO FRAME POSITION

CROSS-REFERENCE TO RELATED APPLICATION

This application claims priority to U.S. provisional patent application No. 63/449,783, filed Mar. 3, 2023, which is hereby incorporated by reference.

BACKGROUND

The evolution of data storage devices to include data processing cores, graphics processing units, and accelerators in the system on chip (SoC) has improved video processing capabilities of data storage devices. As such, data storage devices have been used to store a video stream sent to it by a host in a surveillance system or in a digital video recorder (DVR) environment. The video stream can contain multiple video frames of different frame types following a specific pattern defined under a video standard, such as the Moving Picture Experts Group Transport Stream (MPEG-TS).

DETAILED DESCRIPTION

Figure 1A:
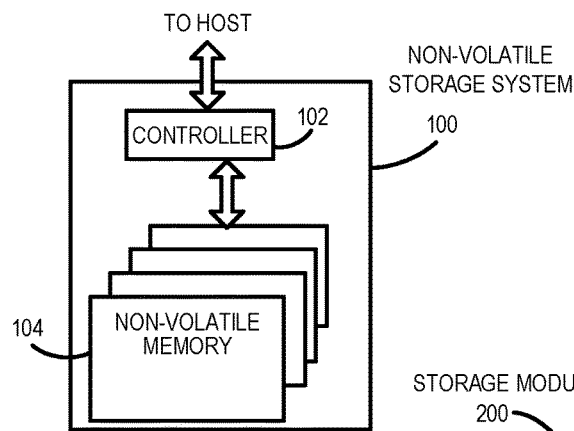
FIG. 1A is a block diagram of a data storage device of an embodiment.

The following embodiments generally relate to a data storage device and method for selecting a data recovery mechanism based on a video frame position. In one embodiment, a data storage device is provided comprising a memory and a controller. The controller is configured to retrieve a video frame stored in the memory; detect an error in the video frame; and select how to handle the error based on a position of the video frame in a group of pictures.

In some embodiments, the position of the video frame in the group of pictures is identified by a video engine.

In some embodiments, the video engine is in the data storage device.

In some embodiments, the video engine is in a host in communication with the data storage device.

In some embodiments, the controller is further configured to select a relatively-more-robust data recovery mechanism or a relatively-less-robust data recovery mechanism in response to the video frame being closer to a beginning of the group of pictures or closer to an end of the group of pictures, respectively.

In some embodiments, the relatively-more-robust data recovery mechanism comprises an exclusive-or (XOR) mode of recovery and the relatively-less-robust data recovery mechanism comprises an error correction code (ECC) mode of recovery.

In some embodiments, the video frame comprises a video frame type, and the controller is further configured to select how to handle the error based on the video frame type.

In some embodiments, the video frame type comprises an intra-coded picture frame (I-frame), a predicted picture frame (P-frame), or a bi-directional predicted picture frame (B-frame); and the controller is further configured to select a more-robust data recovery mechanism for an I-frame than for a P-frame or for a B-frame.

In some embodiments, the controller is further configured to store different video frame types in different regions of the memory, wherein each region of the memory is associated with a different data recovery mechanism.

In some embodiments, the different regions of the memory comprise different endurance, protection, and/or aging characteristics.

In some embodiments, the memory comprises a three-dimensional memory.

In another embodiment, a method is provided that is performed in a data storage device comprising a memory. The memory comprises: detecting an error in a video frame retrieved from the memory; determining a video frame type of the video frame; and selecting a data recovery mechanism based on the video frame type.

In some embodiments, the video frame type comprises an intra-coded picture frame (I-frame), a predicted picture frame (P-frame), or a bi-directional predicted picture frame (B-frame); and a different data recovery mechanism is selected for the I-frame than for the P-frame or for the B-frame.

In some embodiments, wherein an exclusive-or (XOR) recovery mechanism is selected for the I-frame and an error correction code (ECC) recovery mechanism is selected for the P-frame or for the B-frame.

In some embodiments, the video frame type of the video frame is associated with a position of the video frame in a group of pictures.

In some embodiments, the video frame type of the video frame is determined by receiving information from a video engine.

In some embodiments, the video engine is in the data storage device.

In some embodiments, the video engine is in a host in communication with the data storage device.

In some embodiments, the method further comprises storing different video frame types in different regions of the memory, wherein each region of the memory is associated with a different data recovery mechanism.

In another embodiment, a data storage device is provided comprising: a memory; and means for selecting an data recovery mechanism to correct an error in a video frame retrieved from the memory based on a position of the video frame in a group of pictures.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
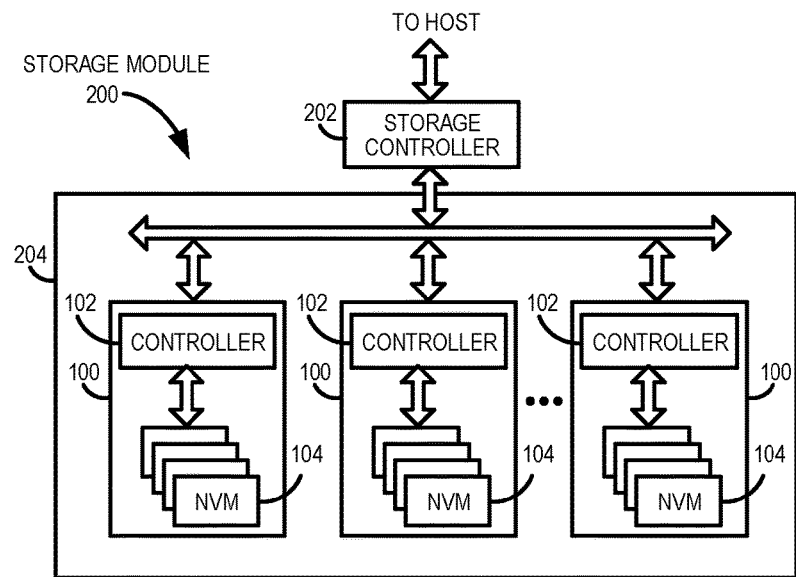
FIG. 1B is a block diagram illustrating a storage module of an embodiment.
Figure 1C:
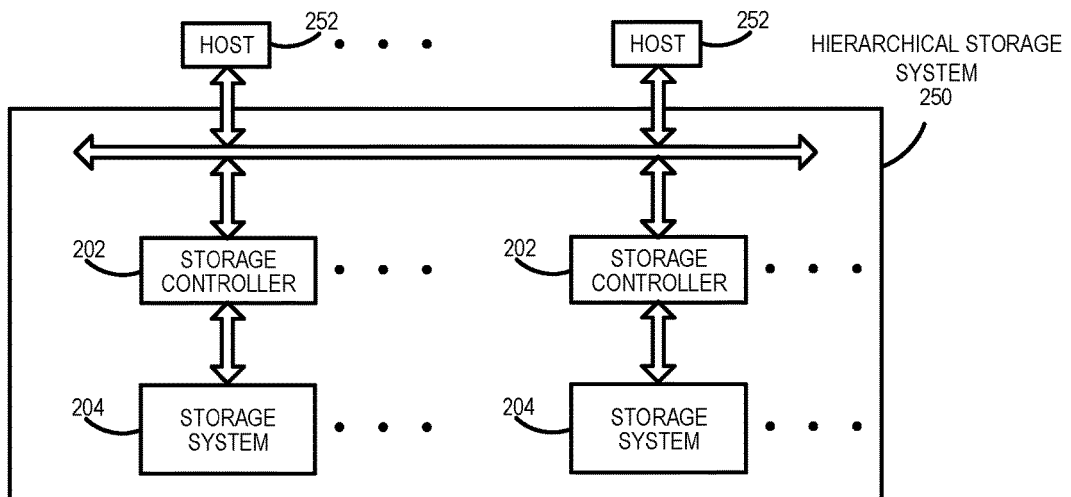
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
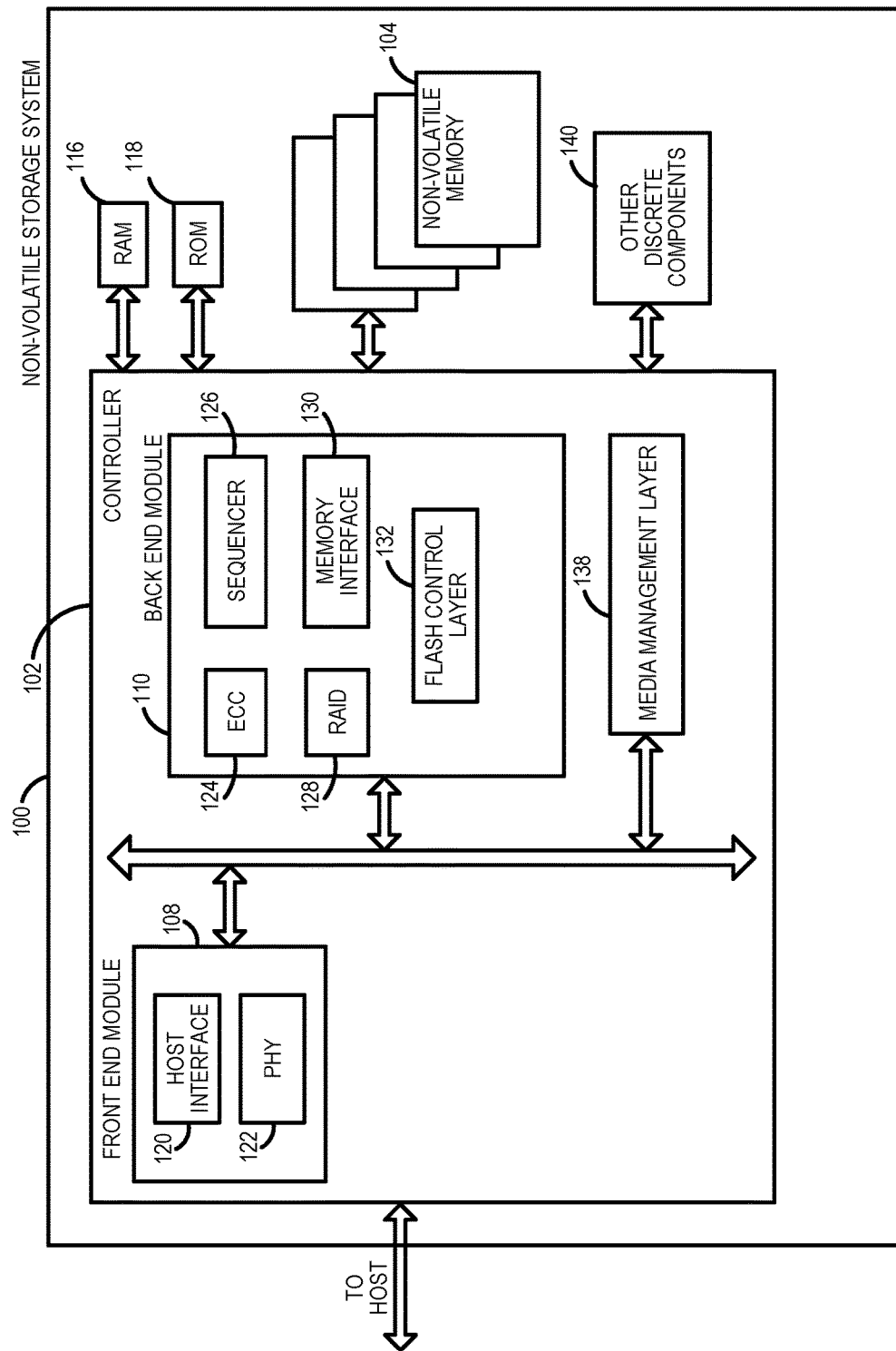
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
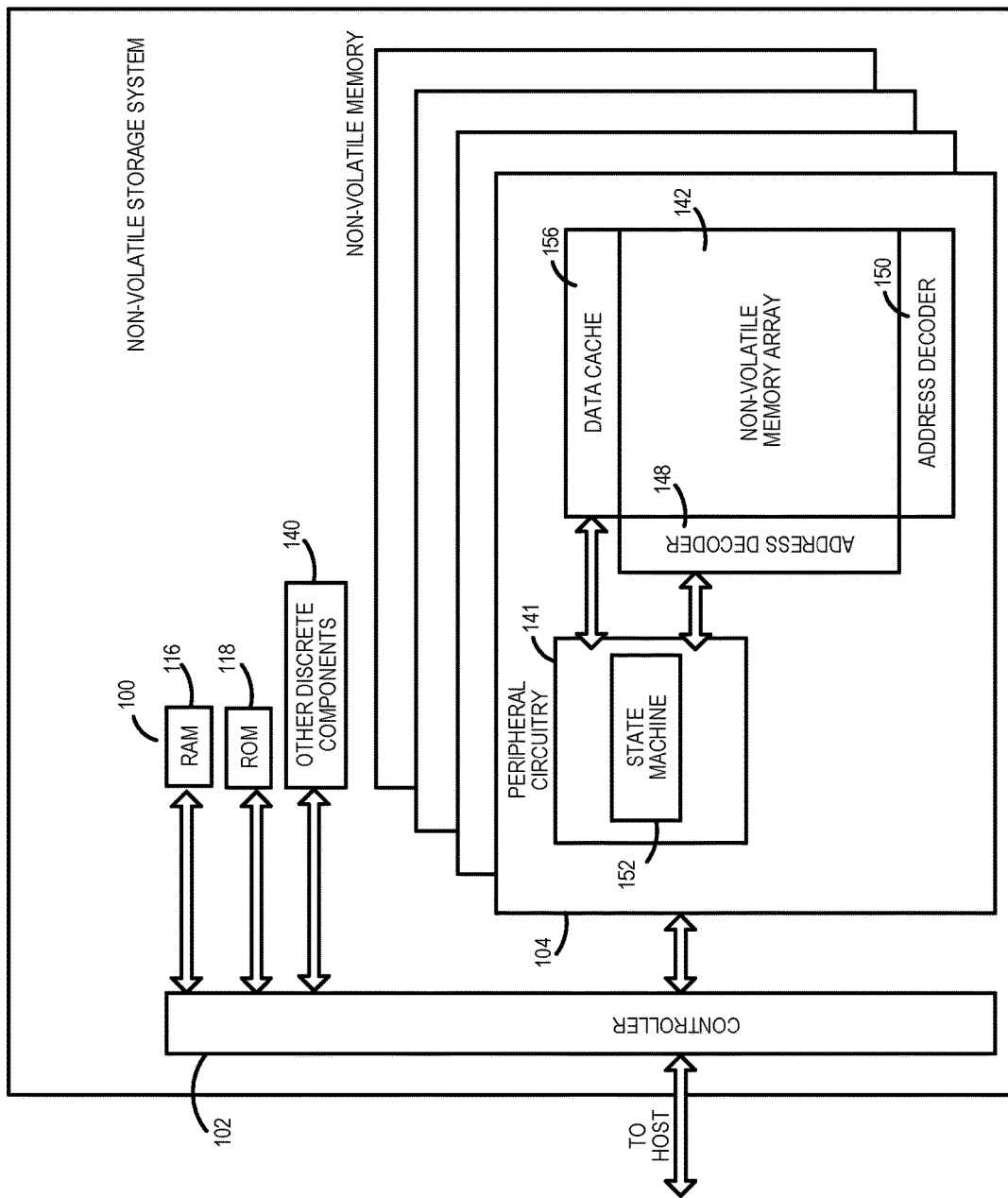
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
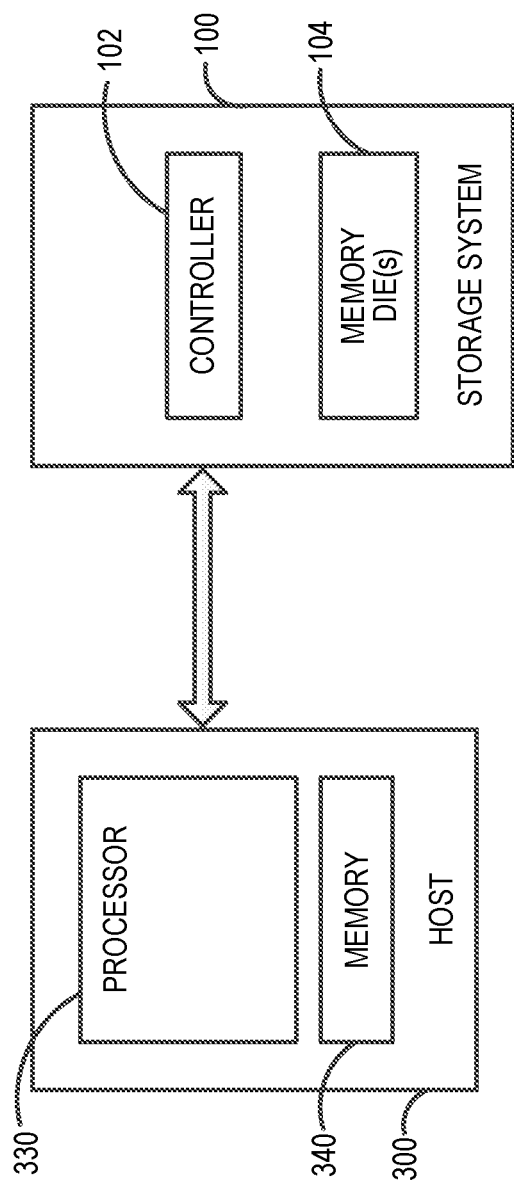
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, the evolution of data storage devices to include data processing cores, graphics processing units, and accelerators in the system on chip (SoC) has improved video processing capabilities of data storage devices. As such, data storage devices have been used to store a video stream sent to it by a host in a surveillance system or in a digital video recorder (DVR) environment. The video stream can contain multiple video frames of different frame types following a specific pattern defined under a video standard, such as the Moving Picture Experts Group Transport Stream (MPEG-TS).

In general, with video compression, different video frames are compressed using different compression algorithms. Different video frames can be classified into different picture or frame types. Three of the major types are intra-coded picture frames (I-frames), predicted picture frames (P-frames), and bi-directional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible that I-frames. A bi-directional predicted picture frame (B-frame) contains differences between the current frame and both the preceding and following frames. Accordingly, B-frames provide the highest amount of data compression.

Figure 4:
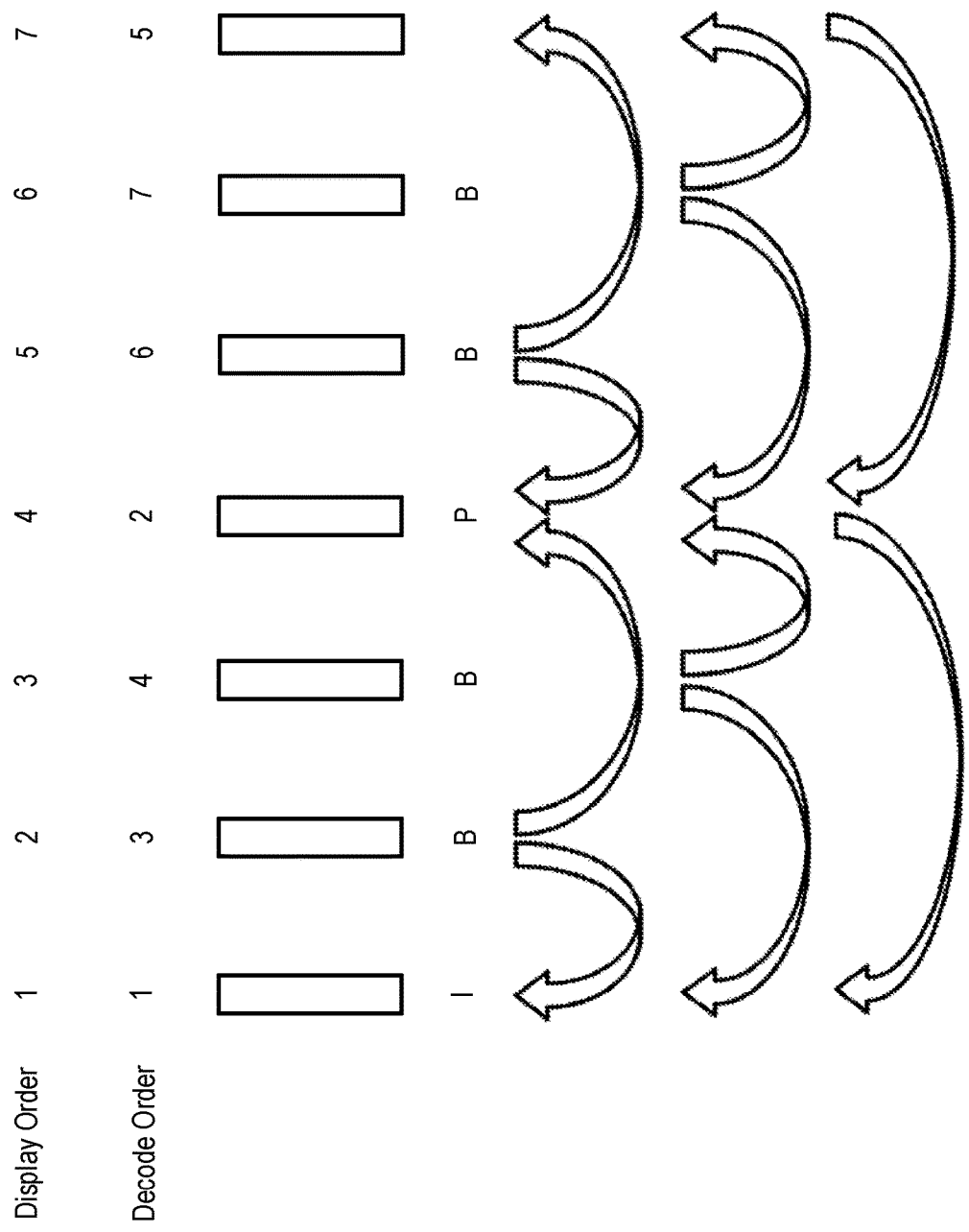
FIG. 4 is a diagram illustrating display and decode orders of video frames of an embodiment.

A group of pictures (GoP) are a group of video frames usually presented as a group. Typically, there could be 25 frames in a GoP, also referred as a 25 frames per second (FPS) video. Since an I-frame is on its own when it comes to video decoding, an I-frame is the first frame in any GoP in this embodiment. Once the I-frame is decoded, the frames that follow (P-frames and B-frames) in the GoP are dependent on the I-frame for decoding. The B-frame is further dependent on a P-frame as well for decoding. As an example of the dependency, FIG. 4 shows that the decoding of the second frame of the GoP is important in decoding the sixth frame of the GoP. The dependency of some frames may also be due to video compression technology to optimize network and storage bandwidth.

If a given frame has an error (e.g., if any area (e.g., flash management unit (FMU)) of the memory 104 storing part of that frame is not recoverable), only the previous frames can be used in that GoP, assuming no bi-directional dependency. For B-frames, the dependency is on I- and P-frames, as shown in FIG. 4. Since all frames directly or indirectly depend on an I-frame, the decoding of the I-frame is important for successful decoding of the rest of the frames in the GoP because a loss of an I-frame can prevent the decoding of upcoming frames until the next GoP.

The controller 102 of the data storage device 100 can be enabled with one or more data recovery mechanisms to attempt to identify and correct an error in a video frame read from the memory 104. These various data recovery mechanisms can have different levels of robustness. For example, one data recovery mechanism can be error correction code (ECC), where one or more parity bits are added to data before it is stored in the memory 104, so that the number of bits of a certain value (e.g., "1") is even or odd. That way, if the number of "1" bits was even when stored but odd when read, or vice versa, the controller 102 would know an error exists in the data and can attempt to correct it.

Another example of a data recovery mechanism is enhanced ECC, which uses more ECC parity bits in the error correction process. While enhanced ECC may be able to correct errors that ECC with fewer parity bits cannot, more system resources and/or time is spent using enhanced ECC than regular ECC. As yet another example, an exclusive-or (XOR) mechanism can be used. With XOR, data stored in memory planes across one or more memory dies is XORed together to generate XOR parity information. XOR recovery is more time and cache consuming among other resources. ECC uses parity attached to the data prior to storage. So, in a system that has ECC and XOR, the mode of recovery can be either way—ECC first and XOR second, or vice-versa. Both have pros and cons, and each of them may be equally important; however, ECC is used even in low-cost products that cannot afford the cache requirements of XOR. Enhanced recovery is possible with ECC, which involves more latency and system resources. XOR recovery is Boolean—either the system decides to perform XOR recovery (extensive latency and resources) or decides to not perform (no wastage). It should be noted that these are merely examples and that other type of data recovery mechanisms can be used.

In one embodiment, the controller 102 stores the parity information need for multiple data recovery mechanisms and selects the data recovery mechanism to use when data is read from the memory 104. As mentioned above, a more-robust data recovery mechanism can have a better chance of correcting an error but can require more time and/or resources of the controller 102, which can reduce the performance of the data storage device 100. So, the controller 102 can consider this tradeoff when deciding which data recovery mechanism to use. More specifically, the following embodiments recognize that all erroneous frames do not have an equal GoP quality of service (QOS) impact. This enables a tradeoff consistent with application requirements. So, in one embodiment, the controller 102 in the data storage device 100 can determine which data recovery mechanism to use to recover a video frame in a failing memory fragment based on the position of the video frame in the GoP.

For example, the controller 102 can tag a video frame for "aggressive recovery" (e.g., XOR recovery) if the failing fragment is in an I-frame (usually the first fragment of the GoP) or another video frame (B or P) whose index is closer to 0 (the beginning of the GoP) (e.g., 2 or 5). On the other hand, the controller 102 can tag another video frame to "forgo recovery" if that video frame is positioned closer to the last frame in the GoP (e.g., frame 27 or 28 in a 30 frame-per-second video). Further, the controller 102 can tag a video frame that is in the middle of the GoP for "normal recovery" (e.g., regular ECC recovery). So, the aggressiveness of the data recovery can be based on the decode order of the video frame since spending too many resources on a frame towards the end of GoP may not add much value. In contrast, spending resources on the I-frame or on a frame in the earlier stages of the GoP can be more useful since that recovery assists in the decoding of the rest of the frames in that GoP. So, these embodiments can be used to enable a value conversion from the video stream to the storage technology.

In some embodiments, the controller 102 can request multiple stages of data recovery, where erroneous data is returned in the first stage followed by some portion of recovery in subsequent stages of data correction. For example, the controller 102 may provide ECC corrected data to start with, which may not be entirely accurate, and then perform XOR recovery to provide more-accurate data recovery after some latency.

Figure 5:
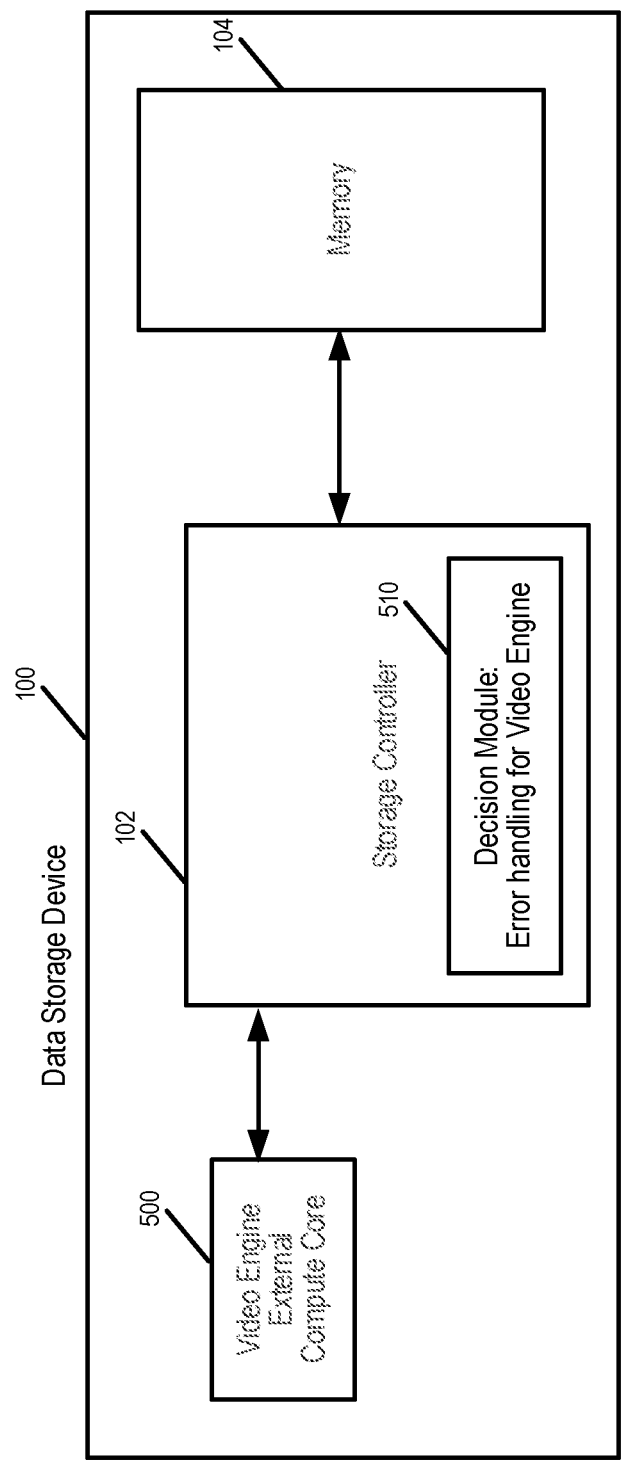
FIG. 5 is a block diagram of a data storage device of an embodiment.
Figure 6:
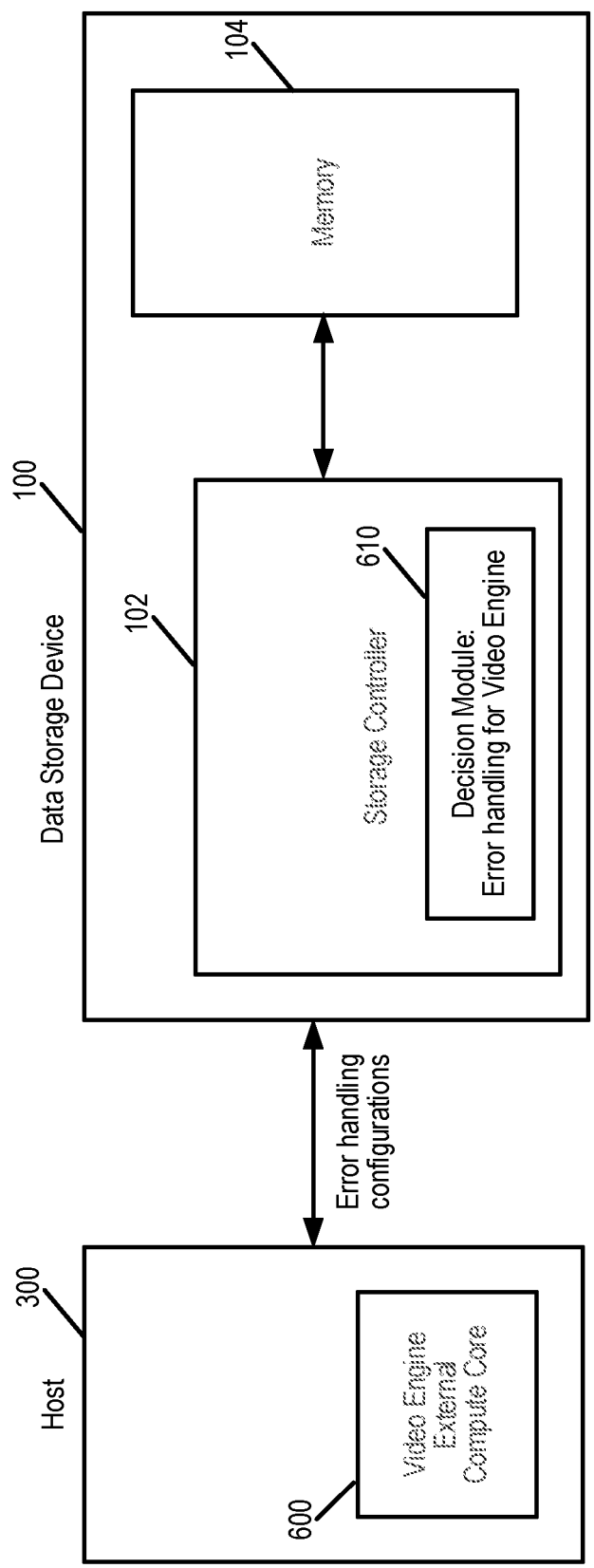
FIG. 6 is a block diagram of a host and a data storage device of an embodiment.

Turning again to the drawings, FIG. 5 shows an example implementation of an embodiment. It should be noted that this is merely one implementation and other implementations can be used. As shown in FIG. 5, in this example, the data storage device 100 comprises a video engine with an internal compute core 500 and a (software- or hardware-based) decision module 510. In this example, the video engine 500 is external to the controller 102 and the decision module 510 is internal to the controller 102, but different configurations can be used, such as the video engine 500 and the decision module 510 both being internal to the controller 102. Also, as shown in FIG. 6, in another embodiment, the video engine 600 is in the host 300, while the decision module 610 is internal to the controller 102 of the data storage device 100. In this alternative, the tagging can be through a vendor command or similar commands. Again, different configurations are possible.

Figure 7:
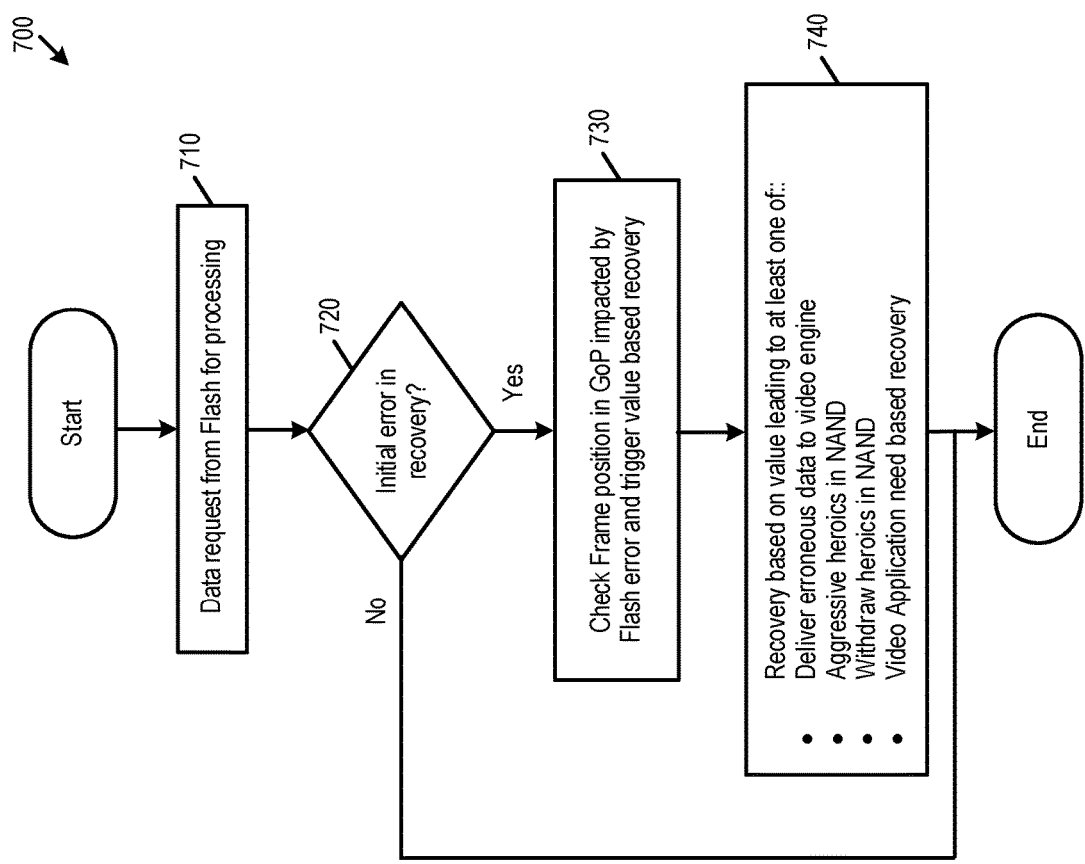
FIG. 7 is a flow chart of a method of an embodiment for selecting a data recovery mechanism based on a video frame position.

Turning again to the drawings, FIG. 7 is a flow chart 700 of a method for selecting a data recovery mechanism based on a video frame position. As shown in FIG. 7, the controller 102 sends a request to the memory 104 to retrieve a video frame stored in the memory 104 (act 710). This request can be generated when a video processing core in the host 300 or the data storage device 100 wants to access a video frame stored in the memory 104. In the process of retrieving the video frame, the controller 102 determines if there is an error in the video frame (act 720). In response to a detected error, the controller 102 determines the video frame's position in a group of pictures (GoP) and selects a data recovery mechanism based on the video frame's position (act 730). For example, the controller 102 can trigger a value-based recovery mechanism to determine whether data having an initial failure belongs to a video frame in an initial part of the GoP or in a later part of the GoP. If the video frame is in the initial part of the GoP, the video engine/compute core can request the controller 102 perform an extended recovery mechanism since the loss potentially impacts the decoding of the rest of the GOP frames. In contrast, if the video frame is in the later part of the GoP, the video engine/compute core can suggest dropping the failing fragment as the value of the frame is relatively less and can usually be stubbed for approximation.

More generally, as shown at act 740 in FIG. 7, there can be a predetermined agreement between the video processing core and the controller 102 for dealing with error handling based on the position of the frame in a GoP. The controller 102 can perform enhanced recovery ("heroics") in stages to provide better data in subsequent recovery stages. The controller 102 can also withdraw the heroics altogether for some video frames. Further, the controller 102 can perform aggressive data recovery in some video frames based on frame position in the GoP. The controller 102 can also modify recovery aggressiveness based on a requirement of the host application (e.g., for simple object detection, the application may not need the set of all frames, so the controller 102 can skip the failing frame and go to the I-frame of the next GoP). As can be seen by these examples, the controller 102 can used a data recovery mechanism that is consistent with the frame's value, thus optimizing the data storage device's backend resources.

There are many alternatives that can be used with these embodiments. For example, in one alternative, the controller 102 segregates different types of video frames to different locations in the memory 104 that have different characteristics (e.g., endurance, protection, and aging). In this way, the controller 102 can use different data recovery mechanisms based on a memory region storing certain frame types. For example, I-frames can be stored in a first memory region, while B-frames can be stored in a second memory region, and the controller 102 can use a more-robust data recovery scheme for the first memory region than the second memory region.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a processor configured to communicate with the memory and further configured to:
retrieve a video frame stored in the memory, wherein the video frame is part of a group of pictures;
detect an error in the video frame;
determine whether the video frame is an intra-coded picture frame (I-frame) or another picture frame in the group of pictures that depends on the I-frame for decoding; and
select how to handle the error based on whether the video frame is the I-frame or the another picture frame in the group of pictures that depends on the I-frame for decoding;
wherein:
a relatively-more-robust data recovery mechanism is selected in response to determining that the video frame is the I-frame; and
a relatively-less-robust data recovery mechanism is selected in response to determining that the video frame is the another picture frame in the group of pictures that depends on the I-frame for decoding;
the relatively-more-robust data recovery mechanism comprises an exclusive-or (XOR) mode of recovery; and
the relatively-less-robust data recovery mechanism comprises an error correction code (ECC) mode of recovery.

2. The data storage device of claim 1, wherein a position of the video frame in the group of pictures is identified by a video engine.

3. The data storage device of claim 2, wherein the video engine is in the data storage device.

4. The data storage device of claim 2, wherein the video engine is in a host in communication with the data storage device.

5. The data storage device of claim 1, wherein the another picture frame in the group of pictures that depends on the I-frame for decoding comprises a predicted picture frame (P-frame).

6. The data storage device of claim 1, wherein the another picture frame in the group of pictures that depends on the I-frame for decoding comprises a bi-directional predicted picture frame (B-frame).

7. The data storage device of claim 1, wherein the processor is further configured to store different video frame types in different regions of the memory, wherein each region of the memory is associated with a different data recovery mechanism.

8. The data storage device of claim 7, wherein the different regions of the memory comprise at least one of a different endurance characteristic, a different protection characteristic, and/or a different aging characteristic.

9. The data storage device of claim 1, wherein the memory comprises a three-dimensional memory.

10. A method comprising:
performing in a data storage device comprising a memory:
detecting an error in a video frame retrieved from the memory, wherein the video frame is part of a group of pictures;
selecting a relatively-more-robust data recovery mechanism in response to the video frame being an intra-coded picture frame (I-frame); and selecting a relatively-less-robust data recovery mechanism in response to the video frame being another picture frame in the group of pictures that depends on the I-frame for decoding;

wherein:

the relatively-more-robust data recovery mechanism comprises an exclusive-or (XOR) mode of recovery; and the relatively-less robust data recovery mechanism comprises an (ECC) mode of recovery.

11. The method of claim 10, further comprising determining a position of the video frame in the group of pictures.

12. The method of claim 10, further comprising using a video engine to determine whether the video frame is the I-frame or the another picture frame in the group of pictures that depends on the I-frame for decoding.

13. The method of claim 12, wherein the video engine is in the data storage device.

14. The method of claim 12, wherein the video engine is in a host in communication with the data storage device.

15. The method of claim 10, further comprising storing different video frame types in different regions of the memory, wherein each region of the memory is associated with a different data recovery mechanism.

16. The method of claim 10, wherein the another picture frame in the group of pictures that depends on the I-frame for decoding comprises a predicted picture frame (P-frame).

17. The method of claim 10, wherein the another picture frame in the group of pictures that depends on the I-frame for decoding video frame type comprises a bi-directional predicted picture frame (B-frame).

18. A data storage device comprising:

a memory; and means for:

detecting an error in a video frame retrieved from the memory, wherein the video frame is part of a group of pictures;

selecting a relatively-more-robust data recovery mechanism in response to the video frame being an intra-coded picture frame (I-frame); and selecting a relatively-less-robust data recovery mechanism in response to the video frame being another picture frame in the group of pictures that depends on the I-frame for decoding;

wherein:

the relatively-more-robust data recovery mechanism comprises an exclusive-or (XOR) mode of recovery; and the relatively-less-robust data recovery mechanism comprises an (ECC) mode of recovery.

* * * * *